US009594584B2

(12) United States Patent
Choi et al.

(10) Patent No.: US 9,594,584 B2
(45) Date of Patent: Mar. 14, 2017

(54) APPARATUS AND METHOD FOR MAPPING OF TENANT BASED DYNAMIC PROCESSOR

(71) Applicant: ELECTRONICS AND TELECOMMUNICATIONS RESEARCH INSTITUTE, Daejeon (KR)

(72) Inventors: Kang Il Choi, Daejeon (KR); Bhum Cheol Lee, Daejeon (KR); Jung Hee Lee, Daejeon (KR); Jong Geun Park, Daejeon (KR); Sang Min Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 93 days.

(21) Appl. No.: 14/621,877

(22) Filed: Feb. 13, 2015

(65) Prior Publication Data

US 2015/0277954 A1    Oct. 1, 2015

(30) Foreign Application Priority Data

Mar. 31, 2014  (KR) .................. 10-2014-0037778
Jun. 17, 2014  (KR) .................. 10-2014-0073780

(51) Int. Cl.
*G06F 9/455*    (2006.01)
*H04L 12/931*   (2013.01)
*H04L 12/861*   (2013.01)

(52) U.S. Cl.
CPC ......... *G06F 9/45558* (2013.01); *H04L 49/70* (2013.01); *G06F 2009/45595* (2013.01); *H04L 49/90* (2013.01)

(58) Field of Classification Search
CPC ....... G06F 9/45558; G06F 2009/45595; H04L 49/70; H04L 49/90
(Continued)

(56) References Cited

U.S. PATENT DOCUMENTS 7,765,405 B2    7/2010  Pinkerton et al.
8,060,875 B1 *  11/2011  Lambeth ............... G06F 9/5077
                                                          709/223
(Continued)

FOREIGN PATENT DOCUMENTS

KR   10-2008-0102889 A    11/2008
KR   10-2013-0093832 A     8/2013

OTHER PUBLICATIONS

Shue, David, Freedman, Michael J. and Shaikh, Anees, "Performance Isolation and Fairness for Multi-Tenant Cloud Storage," 10th USENIX Symposium on Operating Systems Design and Implementation, USENIX Association, 2012, pp. 349-362.*

(Continued)

*Primary Examiner* — Qing Chen
*Assistant Examiner* — Andrew M Lyons
(74) *Attorney, Agent, or Firm* — LRK Patent Law Firm (57) ABSTRACT

An apparatus and a method for mapping of a tenant based dynamic processor, which classify virtual machine multi queues and processors processing the corresponding multi queues for each tenant that one or more virtual machines are belonged to, dynamically map the virtual machine multi queues that belong to the corresponding tenant to multi processors that belong to the corresponding tenant based on total usages of a network and a processor for each tenant to provide network virtualization to assure network traffic processing of virtual machines that belong to the same tenant not to be influenced by congestion of network traffic that belongs to another tenant.

16 Claims, 5 Drawing Sheets

(58) Field of Classification Search
USPC .................................................... 718/1
See application file for complete search history.

(56) References Cited

U.S. PATENT DOCUMENTS

| | | | | |
|---|---|---|---|---|
| 8,462,632 B1* | 6/2013 | Vincent | .................. | H04L 47/30 370/235 |
| 2008/0002663 A1* | 1/2008 | Tripathi | .................. | H04L 45/00 370/351 |
| 2010/0257263 A1* | 10/2010 | Casado | .................. | H04L 49/00 709/223 |
| 2011/0023042 A1* | 1/2011 | Pope | .................... | G06F 9/5033 718/102 |
| 2012/0030673 A1 | 2/2012 | Sakamoto | | |
| 2012/0079478 A1* | 3/2012 | Galles | ................ | H04L 47/2441 718/1 |
| 2012/0250682 A1* | 10/2012 | Vincent | ............... | H04L 12/4633 370/390 |
| 2012/0250686 A1* | 10/2012 | Vincent | ............... | H04L 12/4633 370/392 |
| 2013/0003538 A1* | 1/2013 | Greenberg | .............. | H04L 47/12 370/230 |
| 2013/0097600 A1* | 4/2013 | Cardona | ............. | G06F 9/45558 718/1 |
| 2013/0125124 A1* | 5/2013 | Kempf | ................ | G06F 9/45533 718/1 |
| 2013/0179574 A1* | 7/2013 | Calder | ................ | G06F 9/5033 709/226 |
| 2013/0188635 A1 | 7/2013 | Park et al. | | |
| 2013/0239119 A1* | 9/2013 | Garg | ..................... | G06F 9/5083 718/105 |
| 2014/0052877 A1* | 2/2014 | Mao | ...................... | H04L 61/103 709/245 |
| 2014/0058871 A1* | 2/2014 | Marr | .................... | G06F 9/45533 705/26.1 |
| 2014/0185616 A1* | 7/2014 | Bloch | ................. | G06F 9/45533 370/392 |
| 2014/0208318 A1* | 7/2014 | Zhang | ................ | G06F 9/45529 718/1 |
| 2014/0254594 A1* | 9/2014 | Gasparakis | ............ | H04L 45/74 370/392 |
| 2014/0282510 A1* | 9/2014 | Anderson | .......... | G06F 9/45558 718/1 |
| 2015/0172169 A1* | 6/2015 | DeCusatis | ............... | H04L 45/14 718/1 |
| 2015/0180773 A1* | 6/2015 | DeCusatis | .......... | H04L 12/4641 370/392 |
| 2015/0261556 A1* | 9/2015 | Jain | .................... | G06F 9/45558 718/1 |

OTHER PUBLICATIONS

Wan, Zhitao, "A Network Virtualization Approach in Many-core Processor Based Cloud Computing Environment," 2011 Third International Conference on Computational Intelligence, Communications Systems and Networks, IEEE, 2011, pp. 304-307.*

* cited by examiner

FIG. 1

| TENANT INFORMATION | VIRTUAL MACHINE INFORMATION | VMQ |
|---|---|---|
| A | VM1*, VM2*, VM3* | VMQ1, VMQ2, VMQ3 |
| B | VM4*, VM5* | VMQ4, VMQ5 |
| ... | ... | ... |

APPARATUS AND METHOD FOR MAPPING OF TENANT BASED DYNAMIC PROCESSOR

CROSS-REFERENCE TO RELATED APPLICATIONS

This application claims priority to and the benefit of Korean Patent Application No. 10-2014-0037778 filed in the Korean Intellectual Property Office on Mar. 31, 2014 and Korean Patent Application No. 10-2014-0073780 filed in the Korean Intellectual Property Office on Jun. 17, 2014, the entire contents of which are incorporated herein by reference.

TECHNICAL FIELD

The present invention relates to an apparatus and a method for providing network virtualization, and more particularly, to an apparatus and a method for mapping of a tenant based dynamic processor for providing network virtualization in a multi-tenant based cloud server system.

BACKGROUND ART

A processing technique has been continuously developed, which speeds up network traffic performance in a network interface card (NIC) of a multi-processor based server system. The largest problem was a problem that traffic received in the NIC cannot be effectively processed by a multi-processor in a server. A technique to solve the problem is a received side scaling (RSS) technique. The RSS technique performs a hash function with respect to the network traffic received in the NIC of the multi-processor based server to process the network traffic in different flows. The RSS technique provides a technique in which the network traffic is distributively processed by the multi-processors under a multi-processor environment to rapidly process the distributively processed network traffic by mapping traffic corresponding to the same flow to be processed in the same processor. However, the RSS technique has a problem in that it is difficult to apply the RSS technique to a virtualization environment.

A technique for solving the problem of the RSS under the virtualization environment is a virtual machine queue (VMQ) technique. In the VMQ technique, the network traffic can be distributively processed by the multi-processors to enable rapid traffic processing even under the virtualization environment by a method that creates virtual machine multi queues in the NIC and thereafter, maps the respective virtual machine multi queues to a processor in a host.

For example, a server system sets the VMQ and maps a processor to process the corresponding virtual machine queue. The service system receives a packet input into the server through the NIC and classifies the received packet based on L2 information to send the corresponding packet to the VMQ. In a hypervisor, a processor that processes the corresponding virtual machine queue processes the packet that is input into the corresponding virtual machine queue and transfers the processed packet to a virtual machine (VM) through an L2 virtual switch and the corresponding virtual machine created by the hypervisor processes the received packet. However, since the VMQ technique statically maps the virtual machine queue, too few processor resources may be mapped to multiple queues in which the traffic is congested and too many processor resources may be mapped to a small number of queues which do not almost use the traffic.

SUMMARY OF THE INVENTION

Accordingly, the present invention is contrived to solve the problem and the present invention has been made in an effort to provide an apparatus and a method for mapping of a tenant based dynamic processor, which classify virtual machine multi queues and processors processing the corresponding multi queues for each tenant that one or more virtual machines are belonged to, dynamically map the virtual machine multi queues that belong to the corresponding tenant to multi processors that belong to the corresponding tenant based on total usages of a network and a processor for each tenant to provide network virtualization to assure network traffic processing of virtual machines that belong to the same tenant not to be influenced by congestion of network traffic that belongs to another tenant.

An exemplary embodiment of the present invention provides a network virtualization apparatus, including: a network interface card having a plurality of virtual machine queues; a hypervisor performing switching for transferring a packet of a virtual machine queue of the network interface card to a virtual machine by using a plurality of logical processors and a virtual switch; and one or more virtual machines for each tenant, which are created by hypervisor with respect to tenant information which the hypervisor receives from a cloud OS, wherein the network interface card includes a classifier/sorter that identifies a tenant of the received packet and transfers the packet to the one or more virtual machine queues based on the tenant information and virtual machine information for each tenant received from the hypervisor, and the classifier/sorter controls the packet to be transferred to one or more logical processors mapped to one or more virtual machine queues for each of the same tenant.

The classifier/sorter may statically or dynamically manage in a memory a mapping table of the virtual machine queue and the logical processor in accordance with a predetermined control signal.

The classifier/sorter may identify the tenant based on L2 information or IP information of the received packet.

The classifier/sorter may reflect a traffic processing amount in one or more logical processors in operation, which belong to the same tenant in accordance with a dynamic mapping method in real time to increase or decrease the number of the used logical processors.

In regard to creation of the logical processor in which the traffic processing amount is equal to or more than an upper threshold, the classifier/sorter may operate an additional logical processor by performing a spreading process and map any one or more virtual machine queues that belong to the corresponding same tenant to the additional logical processor.

In regard to creation of the logical processor in which the traffic processing amount is equal to or less than a lower threshold, the classifier/sorter may control the corresponding logical processor to be in an idle state by performing a coalescing process and map the virtual machine queue mapped to the logical processor changed to the idle state to another logical processor in operation.

The hypervisor may create a plurality of virtual machines that operate as a virtual CPU which operates by different operating systems with respect to the tenant information.

The logical processor may process the packet received from one or more virtual machine queues and transfer the packet to the virtual machine corresponding to the corresponding virtual machine queue through the virtual switch.

Another exemplary embodiment of the present invention provides a network virtualization method for transferring a packet to one or more virtual machines created by a hypervisor for virtualization by receiving the packet from a network interface card in a cloud server system, including: (A) creating, by the hypervisor, one or more virtual machines for each tenant with respect to tenant information which the hypervisor receives from a cloud Os; (B) identifying, by the network interface card, a tenant of the received packet and transferring the packet to the one or more virtual machine queues based on the tenant information and virtual machine information for each tenant received from the hypervisor; (C) controlling, by the network interface card, the packet to be transferred by limiting mapping so as to map a virtual machine queue that belongs to any tenant to one or more logical processors that belong to the same tenant among a plurality of logical processors of the hypervisor; and (D) transferring, by the logical processor receiving the packet, the packet to one or more virtual machines that belong to the same tenant through a virtual switch of the hypervisor.

The method may further include statically or dynamically managing, by the network interface card, in a memory a mapping table of the virtual machine queue and the logical processor in accordance with a predetermined control signal.

In step (B), the network interface card may identify the tenant based on L2 information or IP information of the received packet.

The method may further include reflecting, by the network interface card, a traffic processing amount in one or more logical processors in operation, which belong to the same tenant in accordance with a dynamic mapping method in real time to increase or decrease the number of the used logical processors.

In regard to creation of the logical processor in which the traffic processing amount is equal to or more than an upper threshold, the network interface card may operate an additional logical processor by performing a spreading process and map any one or more virtual machine queues that belong to the corresponding same tenant to the additional logical processor.

In regard to creation of the logical processor in which the traffic processing amount is equal to or less than a lower threshold, the network interface card may control the corresponding logical processor to be in an idle state by performing a coalescing process and map the virtual machine queue mapped to the logical processor changed to the idle state to another logical processor in operation.

The hypervisor may create a plurality of virtual machines that operate as a virtualized CPU which operates by different operating systems with respect to the tenant information as the one or more virtual machines.

In step (D), the logical processor may process the packet received from one or more virtual machine queues and transfer the packet to the virtual machine corresponding to the corresponding virtual machine queue through the virtual switch.

According to exemplary embodiments of the present invention, an apparatus and a method for mapping of a tenant based dynamic processor can provide network virtualization to assure network traffic processing of virtual machines that belong to the same tenant not to be influenced by congestion of network traffic that belongs to another tenant.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the present invention will be described in detail with reference to the accompanying drawings. In this case, like reference numerals refer to like elements in the respective drawings. Further, a detailed description of an already known function and/or configuration will be skipped. In contents disclosed hereinbelow, a part required for understanding an operation according to various exemplary embodiments will be described in priority and a description of elements which may obscure the spirit of the present invention will be skipped. Further, some components of the drawings may be enlarged, omitted, or schematically illustrated. An actual size is not fully reflected on the size of each component and therefore, contents disclosed herein are not limited by relative sizes or intervals of the components drawn in the respective drawings.

First, in network virtualization applied to a cloud server system, it should be assured so that network traffic of virtual machines that belong to the same tenant is not influenced by the network traffic of virtual machines that belong to another tenant.

In order to solve a static mapping problem of a virtual machine queue (VMQ) in the related art, a technique (DVMQ) of dynamically mapping the VMQ is attempted. The DVMQ technique is a method that dynamically maps a corresponding virtual machine queue to corresponding multi processors based on a network traffic amount and a total processor usage. When the network traffic amount or the total processor usage is more than a set maximum threshold, multi machine queues mapped to the corresponding processor are dynamically remapped and processed. When the network traffic amount or the total processor usage is less than the set maximum threshold, the corresponding processor is removed from the mapping by dynamically remapping the multi machine queues mapped to the corresponding processor to optimize network traffic processing performance and power consumption.

The DVMQ technique is applied even in network virtualization applied to a cloud server system of the present invention to optimize the network processing performance and the power consumption under a multi-processor environment. However, since the DVMQ technique in the related art is insufficient in considering a situation of a tenant side, the present invention intends to provide network virtualization to assure network traffic processing of virtual machines that belong to the same tenant not to be influenced by congestion of network traffic that belongs to another tenant.

Figure 1:
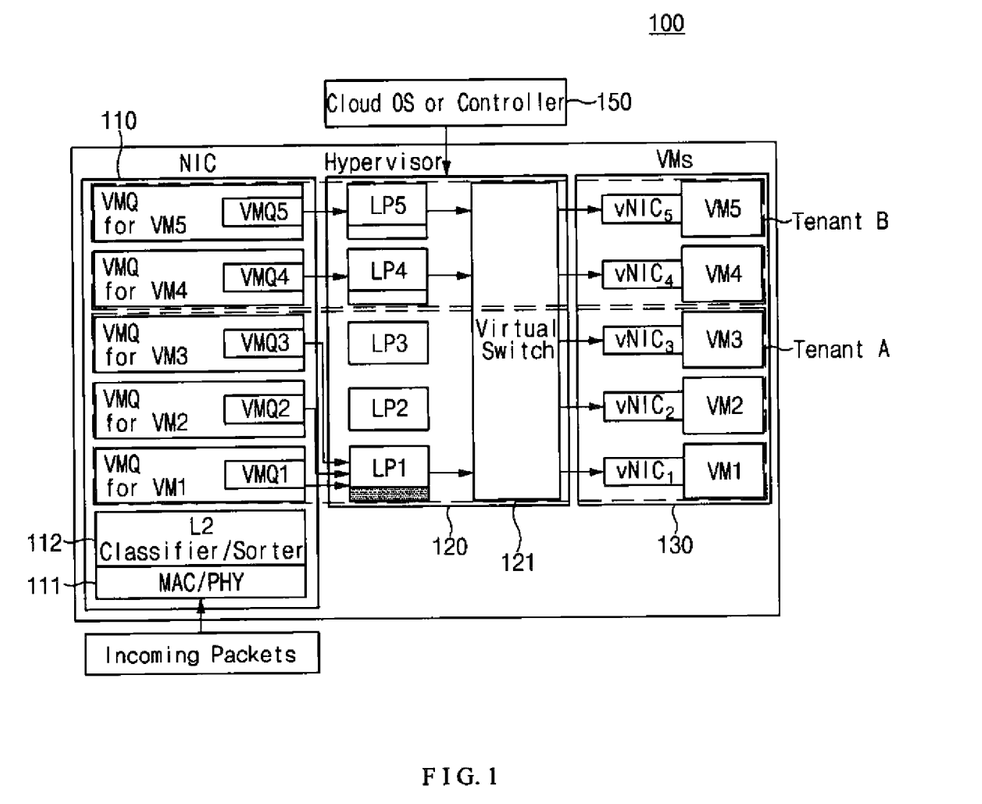
FIG. 1 is a diagram for describing a network virtualization apparatus having a structure of a tenant-based dynamic virtual machine queue (T-DVMQ) for application to a cloud server system for mapping a tenant based dynamic processor according to an exemplary embodiment of the present invention.

FIG. 1 is a diagram for describing a network virtualization apparatus 100 having a structure of a tenant-based dynamic virtual machine queue (T-DVMQ) for application to a cloud server system for mapping a tenant based dynamic processor according to an exemplary embodiment of the present invention.

Referring to FIG. 1, the tenant based network virtualization apparatus 100 according to the exemplary embodiment of the present invention includes a network interface card (NIC) 110, a hypervisor 120, a virtual machine unit 130, a cloud operating system, or a controller (hereinafter, referred to as 'cloud OS') 150.

The components of the network virtualization apparatus 100 may be implemented by hardware (e.g., a semiconductor processor, and the like), software, or a combination thereof, and hereinafter, virtualization means performing a main function by processing by the software. As described below, virtual machines (VMs) VM1 to VM5 of the virtual machine unit 130 is created (occupation-mapped) by the hypervisor 120 by a control by the cloud OS 150, and the respective virtual machines VMs are virtualized hardware, for example, a virtualized CPU for processing data instead of a physical control processing unit (CPU) and operated by respective different operating systems (OSs) and each virtual machine may occupy a partial area of a memory included in the system for the operation. The respective virtual machines (VMs) include virtual network interface cards $vNIC_1$~$vNIC_5$ for interfacing with the hypervisor 120 or other virtual machines.

For example, the cloud OS 150 creates, for example, A, B, and the like (see FIG. 2) as tenant information on a tenant which subscribes to a cloud server system or a universally unique identifier (UUID) which is a tenant ID and notifies the created A, B, and the like to the hypervisor 120, and as a result, the hypervisor 120 (e.g., a creation unit of the hypervisor 120) may create virtual machines VM1~VM3/VM4~VM5/ . . . for the respective tenant corresponding to the tenant information (e.g., A, B, and the like). The hypervisor 120 transfers the tenant information (e.g., A, B, and the like) and virtual machine information for tenant (e.g., identification information on the virtual machines VM1~VM3/VM4~VM5/ . . . designated to correspond for each tenant) to the network interface card (NIC) 110. The hypervisor 120 includes a creation unit for creating the virtual machines VM1~VM3/VM4~VM5/ . . . and besides, includes logical processors (LPs) LP1~LP3/LP4~LP5 processing a packet of the virtual machine queue (VMQ) that belongs to the corresponding tenant in accordance with a predetermined transfer protocol and a virtual switch 121 switching output data of the logical processors (LPs) to be transferred to the virtual machines VM1~VM3/VM4~VM5/ . . . through the virtual network interface cards $vNIC_1$~$vNIC_5$.

The network interface card (NIC) 110 includes a media access control & PHYsical layer (MAC/PHY) processor 111, a layer 2 (L2) classifier/sorter 112, and virtual machine queues (VMQs) VMQ1 to VMQ5.

The MAC/PHY processor 111 determines whether a destination MAC address of a packet received from the outside coincides to receive the packet. The L2 classifier/sorter 112 identifies the tenant (e.g., A, B, and the like) based on the L2 information (e.g., an MAC address of the virtual machine) of the received packet and classifies the packet for each tenant and transfers and loads the classified packet onto the virtual machine queue (VMQ) that belongs to the corresponding distinguished tenant. In some cases, the L2 classifier/sorter 112 may extract Internet protocol (IP) information (e.g., a source IP address, a destination IP address, a protocol, a source port, and a destination port) by parsing the received packet and identify the tenant (e.g., A, B, . . . ) in accordance with tenant identification information (e.g., IP address information of the virtual machine) included therein.

As described above, in the present invention, the virtual machines VM1~VM3/VM4~VM5/ . . . which will process the corresponding packet are designated and created in advance for each of the tenants distinguished by the tenant information (e.g., A, B, and the like), and one or more logical processors (LPs) of the hypervisor 120, which correspond to one or more virtual machines (VMs) distinguished for each tenant and one or more virtual machine queues (VMQs) of the network interface card (NIC) 110 are designated and mapped to be operated.

Figure 2:
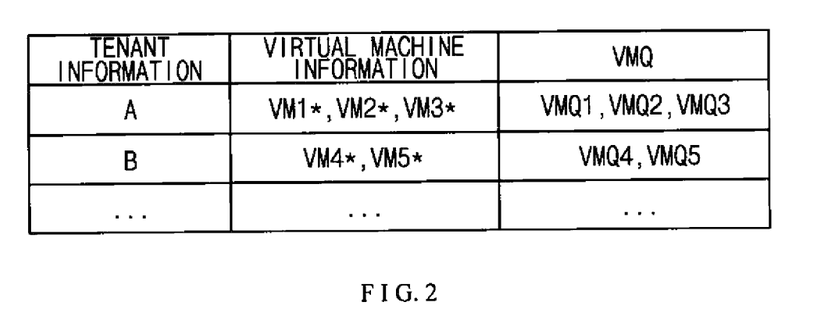
FIG. 2 is an example of a table for tenant information managed by a network interface card (NIC) of FIG. 1 and virtual machine information for each tenant.

However, the L2 classifier/sorter 112 stores and manages in a predetermined memory a table (e.g., able to include corresponding virtual machine queue information) for the tenant information (e.g., A, B, and the like) and virtual machine information (VM1*~VM3*/VM4*~VM5*/ . . . ) (e.g., the virtual machine MAC address or IP address information) for each tenant received from the hypervisor 120 as illustrated in FIG. 2 and classifies the packet received based thereon and transfers the classified packets to one or more virtual machine queues (VMQs) that belong to the corresponding tenant, and may control the packet of the virtual machine queue (VMQ) to be transferred to the corresponding logical processor (LP) by statically or dynamically managing the VMQ/LP mapping table in the memory in accordance with a predetermined control signal of the system as described below. As illustrated in FIG. 2, for example, virtual machine information that belongs to one tenant may be in multiple and the L2 classifier/sorter 112 may transfer the packet to one or more virtual machine queues (VMQs) that correspond to the virtual machine information and belong to the corresponding tenant.

However, in the case of the static mapping, the L2 classifier/sorter 112 controls one or more virtual machine queues (VMQs 1, 2, and 3 in the example of FIG. 1) to transfer the packet to one or more predesignated logical processors (LP1 in the example of FIG. 1). In the example of FIG. 1, it is illustrated that all of VMQ1, VMQ2, and VMQ3 transfer the packet to the LP1, but in some cases, any one of VMQ1, VMQ2, and VMQ3 transfers the packet to the LP1 and the remaining queues may transfer the packet to the LP2 or LP3 and as described above, there is no correspondence relationship between No (1, 2, 3, . . . ) of the virtual machine (VM) and No. (1, 2, 3, . . . ) of the logical processor (LP) and a mapping relationship between the VMQs that belong to the same tenant and the corresponding logical processor (LP) is maintained.

However, the logical processor (LP) may process the packets received from one or more virtual machine queues (VMQs) and transfer the packet to the corresponding virtual machines VM1, VM2, VM3, . . . which are distinguished in accordance with No. (1, 2, 3, . . . ) of the corresponding virtual machine queue through the virtual switch 121. For example, No. of the VMQ and No. of the VM correspond to each other and in FIG. 1, the LP1 that processes the packet in the VMQ1 may transfer the packet processed through the virtual switch 121 to the virtual machine VM1 together with a predetermined identifier for transferring the packet to the virtual machine VM1 in FIG. 1. Similarly, the LP1 that processes the packet transferred in the VMQ2 may transfer the packet to the virtual machine VM2 through the virtual switch 121 and the LP1 that processes the packet transferred in the VMQ3 may transfer the packet to the virtual machine VM3 through the virtual switch 121.

Further, in the case of the dynamic mapping, the L2 classifier/sorter 112 reflects a traffic processing amount (alternatively, a logical processor usage) in one or more logical processors (LPs) in operation, which belong to the corresponding tenant on a plurality of VMQs that belong to the same tenant to increase (spreading process) or decrease (coalescing process) the number of the used logical processors (LPs).

In the present invention, a method for dynamically mapping the virtual machine queue (VMQ) and the logical processor (LP) in the respective tenants may be similar to the DVMQ method in the related art, but in the present invention, in order to support the network virtualization by removing an interference phenomenon among different tenants, when the VMQ/LP mapping table is dynamically changed, a method for transferring the packet by mapping only between the VMQ and the logical processor (LP) that belong to the same tenant is different from the DVMQ method in the related art. According to the tenant based dynamic processor mapping method, it is possible to provide network virtualization to assure network traffic processing of virtual machines that belong to the same tenant not to be influenced by congestion of network traffic that belongs to another tenant in the VMQ or LP that belongs to another tenant.

[Table 1] given below is one example for a mapping table of the virtual machine queue (VMQ) and the logical processor (LP) that processes the corresponding virtual machine queue (VMQ), which may be managed by the L2 classifier/sorter 112. As illustrated in FIG. 2, all virtual machine queues VMQ1, VMQ2, and VMQ3 corresponding to VM1, VM2, and VM3 that belong to tenant A are mapped to the logical processor LP1 that belongs to tenant A to transfer the packet and a VMQ/LP mapping table for a state in which no traffic processing while the logical processors LP2 and LP3 that belong to tenant A are in an idle state is shown in [Table 1]. Further, Table 1 shows an example in which the virtual machine queues VMQ4 and VMQ5 corresponding to VM4 and VM5 that belong to tenant B are mapped to the logical processors LP4 and LP5, respectively.

TABLE 1

VMQ/LP mapping table

| Tenant | Virtual Machine Queue | Logical Processor |
| --- | --- | --- |
| Tenant A | VMQ1 | LP1 |
|  | VMQ2 | LP1 |
|  | VMQ3 | LP1 |
|  | None | LP2, LP3 |
| Tenant B | VMQ4 | LP4 |
|  | VMQ5 | LP5 |

Figure 3:
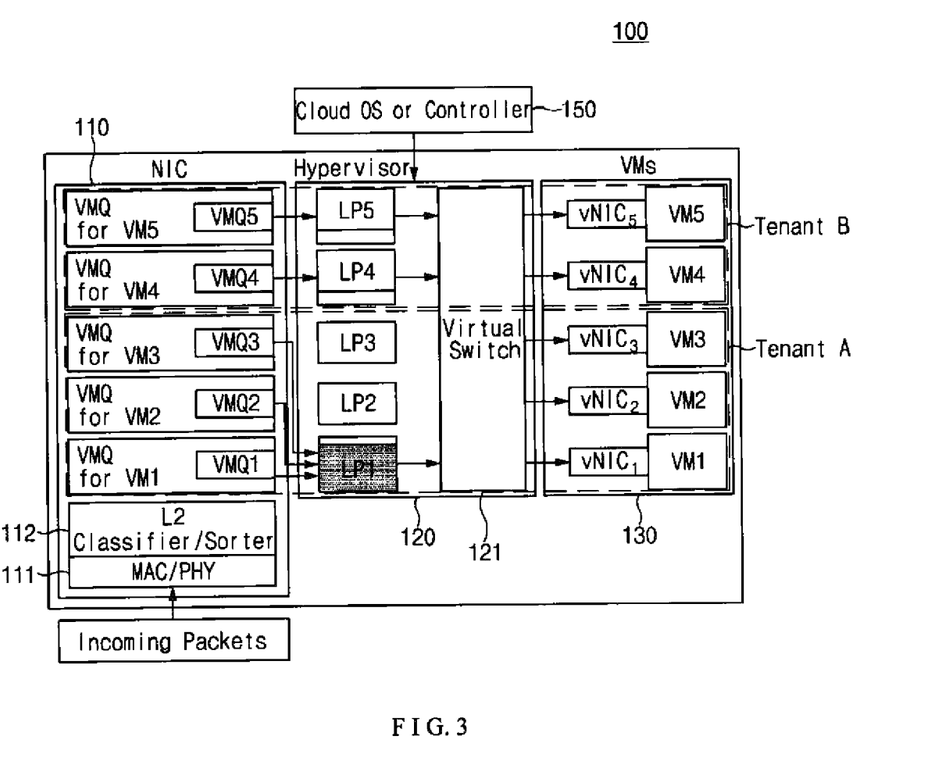
FIG. 3 is a reference diagram for describing a state before changing dynamic VMQ/LP mapping in the tenant based network virtualization apparatus of FIG. 1.

FIG. 3 is a reference diagram for describing a state before changing dynamic VMQ/LP mapping in the tenant based network virtualization apparatus 100 of FIG. 1.

Figure 4:
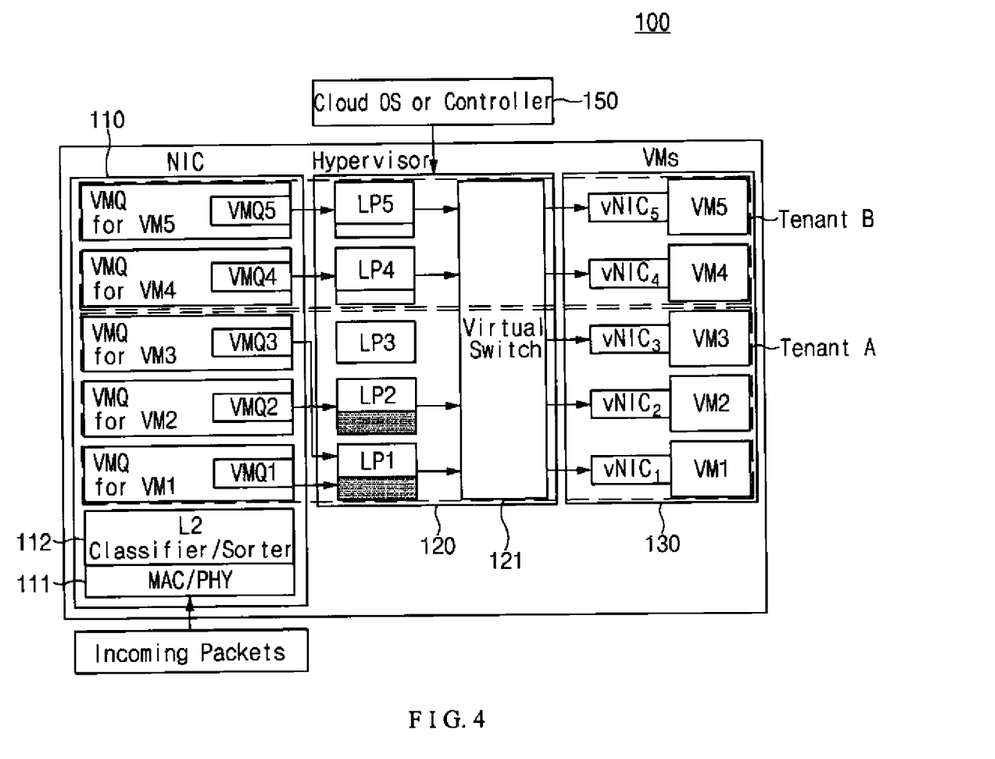
FIG. 4 is a reference diagram for describing a state after changing dynamic VMQ/LP mapping in the tenant based network virtualization apparatus of FIG. 1.

The L2 classifier/sorter 112 of the NIC 110 determines whether the traffic processing amount (alternatively, the logical processor usage) in the logical processor LP1 in operation reaches a predetermined upper threshold as the packet traffic for VMQ1, VMQ2, and VMQ3 increases as illustrated in FIG. 3 and when the traffic processing amount is equal to or more than the upper threshold, the L2 classifier/sorter 112 of the NIC 110 performs a tenant based spreading process to control the logical processor LP2 that belongs to the same tenant to additionally operate as illustrated in FIG. 4. In this case, in order to provide a network virtualization function, the L2 classifier/sorter 112 limits the VMQs that belong to the same tenant to be mapped to only the logical processor that belong to the corresponding tenant to spread the traffic when the VMQ/LP mapping table is dynamically changed as shown in [Table 2] given below.

As a result of performing the tenant based DVMQ spreading process, the VMQ/LP mapping table for VM1, VM2, and VM3 is changed to set the system to show better performance in overall. [Table 2] given below as a modified exemplary embodiment for the VMQ/LP mapping table shows an example of mapping the packets of the virtual machine queues VMQ1 and VMQ3 to be transferred to the logical processor LP1 and the packet of the virtual machine queue VMQ2 to be transferred to the processor LP2. However, the present invention is not limited to the example and there are available all cases in which the plurality of logical processors that belong to the same tenant are mapped to receive the packet by interlocking with one or more virtual machine queues that belong to the corresponding tenant, respectively.

Similarly, when the traffic processing amounts (alternatively, logical processor usages) in both the logical processors LP1 and LP2 in operation reach the predetermined upper threshold, the spreading process is performed to control the logical processor LP3 that belongs to the same tenant to more additionally operate.

TABLE 2

VMQ/LP mapping table

| Tenant | Virtual Machine Queue | Logical Processor |
| --- | --- | --- |
| Tenant A | VMQ1 | LP1 |
|  | VMQ2 | LP2 |
|  | VMQ3 | LP1 |
|  | None | LP3 |
| Tenant B | VMQ4 | LP4 |
|  | VMQ5 | LP5 |

Meanwhile, in the above example, the VMQ that belongs to tenant A includes VMQ1, VMQ2, and VMQ3 and the LP that belongs to tenant A includes LP1, LP2, and LP3. The VMQ that belongs to tenant B includes VMQ4 and VMQ5 and the LP that belongs to tenant B includes LP4 and LP5. In the present invention, in order to remove the interference phenomenon among different tenants, when the VMQ/LP mapping table is dynamically changed, the dynamic change is limited to mapping of the VMQ that belongs to the same tenant and the logical processor that belongs to the corresponding tenant.

In this case, while the VMQ/LP mapping table is applied as illustrated in FIG. 4, when traffic to VMQ2 decreases, and as a result, the traffic processing amount (alternatively, the logical processor usage) in the logical processor LP2 is equal to or less than a predetermined lower threshold, the L2 classifier/sorter 112 of the NIC 110 performs a tenant based DVMQ coalescing process. Even in this case, in order to provide the network virtualization function, the dynamic change is limited to the mapping of the VMQ that belongs to the same tenant and the processor that belongs to the corresponding tenant when the VMQ/LP mapping table is dynamically changed.

As a result of performing the tenant based coalescing process, the VMQ/LP mapping table for VM1, VM2, and VM3 is changed as shown in [Table 1] to set the system to consume lower power in overall. In [Table 1], as one example in which the VMQ/LP mapping table is changed, all of the virtual machine queues VMQ1, VMQ2, and VMQ3 are mapped to the logical processor LP1 in operation and the state of the LP2 processor is changed to the idle state. As described above, the L2 classifier/sorter 112 controls the state of the LP2 logical processor to be changed to the idle state and maps the virtual machine queue VMQ2 mapped to the corresponding logical processor LP2 of which the state is changed to the idle state to another logical processor LP1 in operation, and as a result, the system is restored to the state illustrated in FIG. 1.

Figure 5:
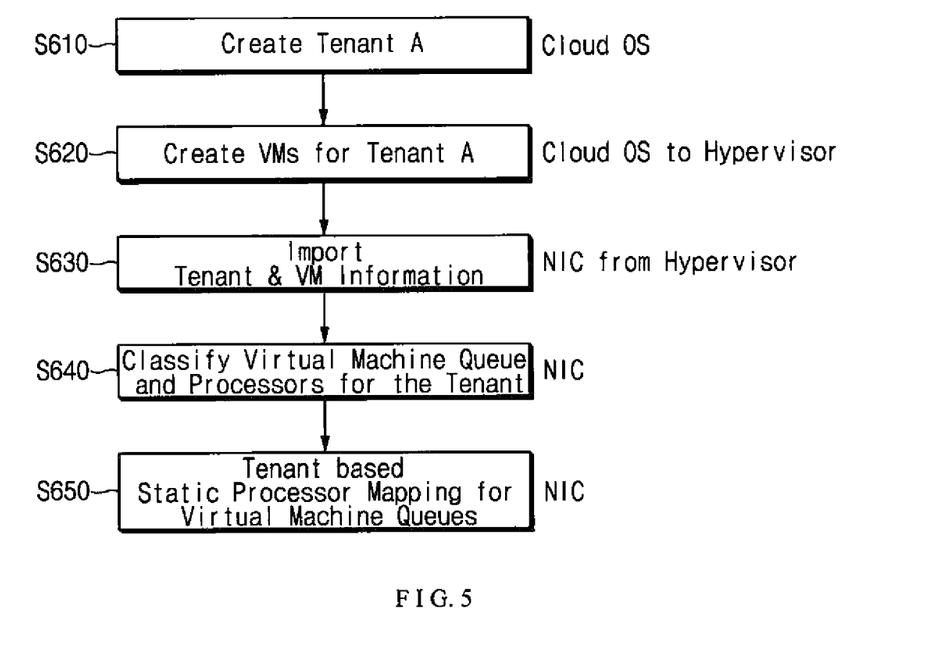
FIG. 5 is a flowchart for describing an exemplary embodiment regarding mapping of a tenant based static processor in the tenant based network virtualization apparatus of FIG. 1.

FIG. 5 is a flowchart for describing an exemplary embodiment regarding mapping of a tenant based static processor in the tenant based network virtualization apparatus 100 of FIG. 1.

First, for example, the cloud OS 150 may create tenant information (e.g., tenant A of FIG. 1) on a new tenant that subscribes to the cloud server system and notify the created tenant information to the hypervisor 120 (S610).

As a result, the hypervisor 120 (e.g., the creation unit of the hypervisor 120) may create the virtual machines (e.g., VM1 to VM3 of FIG. 1) for the respective tenants corresponding to the tenant information (e.g., A) (S620). In this case, one or two or more virtual machines are created according to a subscription condition of the tenant.

The hypervisor 120 transfers the tenant information (e.g., A of FIG. 1) and the virtual machine information for each tenant (e.g., identification information on the virtual machines VM1 to VM3 designated to correspond for each tenant, VM1* to VM3*) to the network interface card (NIC) 110 (S630). The identification information VM1* to VM3* on the virtual machines VM1 to VM3 may be the MAC address or IP address information of the virtual machine.

As a result, the MAC/PHY processor 111 of the network interface card (NIC) 110 receives the packet by determining whether the destination MAC address (alternatively, IP address) of the packet received from the outside coincides and the L2 classifier/sorter 112 identifies the tenant (e.g., A of FIG. 1) and classifies the packet for each tenant based on the L2 information (e.g., the MAC address of the virtual machine) of the received packet, and transfers the classified packets to the virtual machine queue VMQ that belongs to the corresponding distinguished tenant (S640). In some cases, the L2 classifier/sorter 112 may extract Internet protocol (IP) information (e.g., a source IP address, a destination IP address, a protocol, a source port, and a destination port) by parsing the received packet and identify the tenant (e.g., A of FIG. 1) in accordance with tenant identification information (e.g., IP address of the virtual machine) included therein.

In this case, the L2 classifier/sorter 112 may set the virtual machine queues VMQ1, VMQ2, and VMQ3 that belong to the same tenant A to be mapped to one or more predesignated logical processors (e.g., LP1 of FIG. 1) that belong to the same tenant in statically mapping the virtual machine queue (S650).

For example, the L2 classifier/sorter 112 stores and manages, in the predetermined memory, the table (e.g., able to include the corresponding virtual machine queue information) for the tenant information (e.g., A of FIG. 1) received from the hypervisor 129 and the virtual machine information VM1* to VM3* for each tenant as illustrated in FIG. 2 and classifies the received packet based on the table to transfer the packets to one or more virtual machine queues (VMQs) that belong to corresponding tenant. In the case of the static mapping, the L2 classifier/sorter 112 may control one or more virtual machine queues (VMQs 1, 2, and 3 in the example of FIG. 1) to transfer the packet to one or more predesignated logical processors (LP1 in the example of FIG. 1). In the example of FIG. 1, all of VMQ1, VMQ2, and VMQ3 transfer the packet to the LP1, but any one of VMQ1, VMQ2, and VMQ3 may transfer the packet to LP1 and the remaining queues may transfer the packet to LP2 or LP3.

Figure 6:
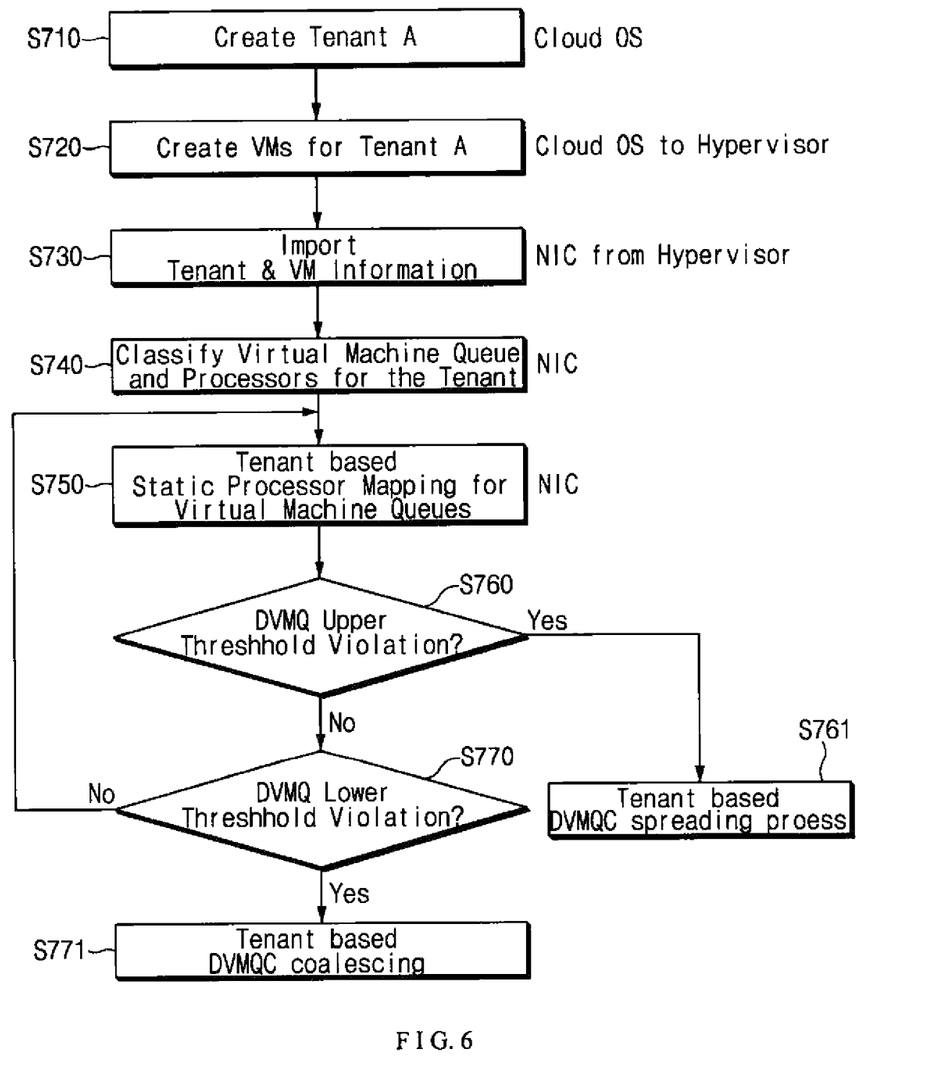
FIG. 6 is a flowchart for describing an exemplary embodiment regarding mapping of a tenant based dynamic processor in the tenant based network virtualization apparatus of FIG. 1.

FIG. 6 is a flowchart for describing an exemplary embodiment regarding mapping of a tenant based dynamic processor in the tenant based network virtualization apparatus 100 of FIG. 1.

First, for example, the cloud OS 150 may create tenant information (e.g., tenant A of FIG. 1) on a new tenant that subscribes to the cloud server system and notify the created tenant information to the hypervisor 120 (S710).

As a result, the hypervisor 120 (e.g., the creation unit of the hypervisor 120) may create the virtual machines (e.g., VM1 to VM3 of FIG. 1) for the respective tenants corresponding to the tenant information (e.g., A) (S720). In this case, one or two or more virtual machines are created according to the subscription condition of the tenant.

The hypervisor 120 transfers the tenant information (e.g., A of FIG. 1) and the virtual machine information for each tenant (e.g., identification information on the virtual machines VM1 to VM3 designated to correspond for each tenant, VM1* to VM3*) to the network interface card (NIC) 110 (S730). The identification information VM1* to VM3* on the virtual machines VM1 to VM3 may be the MAC address or IP address information of the virtual machine.

As a result, the MAC/PHY processor 111 of the network interface card (NIC) 110 receives the packet by determining whether the destination MAC address of the packet received from the outside coincides and the L2 classifier/sorter 112 identifies the tenant (e.g., A of FIG. 1) and classifies the packet for each tenant based on the L2 information (e.g., the MAC address of the virtual machine) of the received packet, and transfers the classified packets to the virtual machine queue VMQ that belongs to the corresponding distinguished tenant (S740). In some cases, the L2 classifier/sorter 112 may extract the Internet protocol (IP) information (e.g., the source IP address, the destination IP address, the protocol, the source port, and the destination port) by parsing the received packet and identify the tenant (e.g., A of FIG. 1) in accordance with the tenant identification information (e.g., IP address of the virtual machine) included therein.

In this case, the L2 classifier/sorter 112 may set the virtual machine queues VMQ1, VMQ2, and VMQ3 that belong to the same tenant A to be mapped to one or more predesignated logical processors (e.g., LP1 of FIG. 1) that belong to the same tenant in statically mapping the virtual machine queue (S750).

For example, the L2 classifier/sorter 112 stores and manages, in the predetermined memory, the table (e.g., able to include the corresponding virtual machine queue information) for the tenant information (e.g., A of FIG. 1) received from the hypervisor 129 and the virtual machine information VM1* to VM3* for each tenant as illustrated in FIG. 2 and classifies the received packet based on the table to transfer the packets to one or more virtual machine queues (VMQs) that belong to corresponding tenant. In the case of the static mapping, the L2 classifier/sorter 112 may control one or more virtual machine queues (VMQs 1, 2, and 3 in the example of FIG. 1) to transfer the packet to one or more predesignated logical processors (LP1 in the example of FIG. 1). In the example of FIG. 1, all of VMQ1, VMQ2, and VMQ3 transfer the packet to the LP1, but any one of VMQ1, VMQ2, and VMQ3 may transfer the packet to LP1 and the remaining queues may transfer the packet to LP2 or LP3.

However, in the controller such as the cloud OS 150 on the system, the L2 classifier/sorter 112 enables the change between the static mapping or the dynamic mapping of the VMQ/LP in accordance with the predetermined control signal and statically or dynamically manages the resulting VMQ/LP table in the memory to control the packet of the virtual machine queue (VMQ) to be transferred to the corresponding logical processor.

In the case of the dynamic mapping, the L2 classifier/sorter 112 reflects the traffic processing amount (alternatively, the logical processor usage) in one or more logical processors (LPs) in operation, which belong to the corresponding tenant on the plurality of VMQs that belong to the same tenant to increase (diffusion process) or decrease (coalescing process) the number of the used logical processors (LPs) (S760, S761, S770, and S771).

For example, when the traffic processing amount (alternatively, the logical processor usage) is equal to or more than the predetermined upper threshold (S760), the L2 classifier/sorter 112 performs the tenant based DVMQ spreading process (S761). In order to provide the network virtualization function, the dynamic change is limited to the mapping of the VMQ that belongs to the same tenant and the processor that belongs to the corresponding tenant when the VMQ/LP mapping table is dynamically changed. That is, the L2 classifier/sorter 112 of the NIC 110 determines whether the traffic processing amount (alternatively, the logical processor usage) in the logical processor LP1 in operation reaches the predetermined upper threshold as the packet traffic for VMQ1, VMQ2, and VMQ3 increases as illustrated in FIG. 3 and when the traffic processing amount is equal to or more than the upper threshold, the L2 classifier/sorter 112 of the NIC 110 performs a tenant based spreading process to control the logical processor LP2 that belongs to the same tenant to additionally operate as illustrated in FIG. 4. In this case, in order to provide a network virtualization function, the L2 classifier/sorter 112 limits the VMQs that belong to the same tenant to be mapped to only the logical processor that belong to the corresponding tenant to spread the traffic when the VMQ/LP mapping table is dynamically changed as shown in [Table 1] given below.

Further, when the traffic processing amount (alternatively, the logical processor usage) is equal to or more than the predetermined lower threshold (S770), the L2 classifier/sorter 112 performs the tenant based DVMQ coalescing process (S771). In order to provide the network virtualization function, the dynamic change is limited to the mapping of the VMQ that belongs to the same tenant and the processor that belongs to the corresponding tenant. That is, while the VMQ/LP mapping table is applied as illustrated in FIG. 3, when traffic to VMQ2 decreases, and as a result, the traffic processing amount (alternatively, the logical processor usage) in the logical processor LP2 is equal to or less than a predetermined lower threshold, the L2 classifier/sorter 112 of the NIC 110 performs a tenant based DVMQ coalescing process. Even in this case, in order to provide the network virtualization function, the dynamic change is limited to the mapping of the VMQ that belongs to the same tenant and the processor that belongs to the corresponding tenant when the VMQ/LP mapping table is dynamically changed.

As the result of performing the tenant based coalescing process as described above, the VMQ/LP mapping table for VM1, VM2, and VM3 is changed as shown in [Table 1] to set the system to consume lower power in overall. In [Table 1], as one example in which the VMQ/LP mapping table is changed, all of the virtual machine queues VMQ1, VMQ2, and VMQ3 are mapped to the logical processor LP1 and the state of the LP2 processor is changed to the idle state. In this case, the system is restored to the state illustrated in FIG. 1.

As described above, in the tenant based network virtualization apparatus 100 of the present invention, in order to support the network virtualization by removing the interference phenomenon among different tenants, when the VMQ/LP mapping table is dynamically changed, the method for transferring the packet by mapping only between the VMQ and the logical processor (LP) that belong to the same tenant is different from the DVMQ method in the related art. According to the tenant based dynamic processor mapping method, it is impossible to provide network virtualization to assure network traffic processing of virtual machines that belong to the same tenant not to be influenced by congestion of network traffic that belongs to another tenant in the VMQ or LP that belongs to another tenant.

The specified matters and limited embodiments and drawings such as specific components in the present invention have been disclosed for illustrative purposes, but are not limited thereto, and those skilled in the art will appreciate that various modifications and changes can be made in the art to which the present invention belongs, within the scope without departing from an essential characteristic of the present invention. The spirit of the present invention is defined by the appended claims rather than by the description preceding them, and the claims to be described below and it should be appreciated that all technical spirit which are evenly or equivalently modified are included in the claims of the present invention.

What is claimed is:
1. A network virtualization apparatus for a cloud server system having a plurality of tenants, comprising:
a network interface card having a plurality of virtual machine queues;
a hypervisor performing switching for transferring a received packet of a virtual machine queue of the network interface card to a virtual machine by using a plurality of logical processors and a virtual switch; and one or more virtual machines for each tenant of the plurality of tenants, which are created by the hypervisor with respect to tenant information which the hypervisor receives from a cloud OS, wherein the network interface card includes a classifier/sorter that identifies a tenant of the received packet and transfers the packet to one or more virtual machine queues for the tenant of the received packet based on the tenant information and virtual machine information for each tenant of the plurality of tenants received from the hypervisor, wherein the classifier/sorter controls the packet to be transferred to one or more logical processors mapped to one or more virtual machine queues for each of the same tenant, wherein the one or more virtual machine queues for each tenant belong to the tenant, wherein one or more logical processors mapped to the one or more virtual machine queues for each tenant belong to the tenant, and wherein each virtual machine of the one or more virtual machines for each tenant belong to the tenant.

2. The apparatus of claim 1, wherein the classifier/sorter statically or dynamically manages in a memory a mapping table of the virtual machine queue and the logical processor in accordance with a predetermined control signal.

3. The apparatus of claim 1, wherein the classifier/sorter identifies the tenant based on L2 information or IP information of the received packet.

4. The apparatus of claim 1, wherein the classifier/sorter reflects a traffic processing amount in one or more logical processors in operation, which belong to the same tenant in accordance with a dynamic mapping method in real time to increase or decrease the number of the used logical processors.

5. The apparatus of claim 4, wherein in regard to creation of the logical processor in which the traffic processing amount is equal to or more than an upper threshold, the classifier/sorter operates an additional logical processor by performing a spreading process and maps any one or more virtual machine queues that belong to the corresponding same tenant to the additional logical processor.

6. The apparatus of claim 4, wherein in regard to creation of the logical processor in which the traffic processing amount is equal to or less than a lower threshold, the classifier/sorter controls the corresponding logical processor to be in an idle state by performing a coalescing process and maps the virtual machine queue mapped to the logical processor changed to the idle state to another logical processor in operation.

7. The apparatus of claim 1, wherein the hypervisor creates a plurality of virtual machines that operate as a virtual CPU which operates by different operating systems with respect to the tenant information.

8. The apparatus of claim 1, wherein the logical processor processes the packet received from one or more virtual machine queues and transfers the packet to the virtual machine corresponding to the corresponding virtual machine queue through the virtual switch.

9. A network virtualization method for transferring a packet to one or more virtual machines created by a hypervisor for virtualization by receiving the packet from a network interface card in a cloud server system having a plurality of tenants, the method comprising:

(A) creating, by the hypervisor, one or more virtual machines for each tenant of the plurality of tenants with respect to tenant information which the hypervisor receives from a cloud OS;

(B) identifying, by the network interface card, a tenant of the received packet and transferring the packet to one or more virtual machine queues for a tenant of the plurality of tenants based on the tenant information and virtual machine information for each tenant of the plurality of tenants received from the hypervisor;

(C) controlling, by the network interface card, the packet to be transferred by limiting mapping so as to map a virtual machine queue that belongs to any tenant of the plurality of tenants to one or more logical processors that belong to the same tenant of the plurality of tenants among a plurality of logical processors of the hypervisor; and (D) transferring, by the logical processor receiving the packet, the packet to one or more virtual machines that belong to the same tenant through a virtual switch of the hypervisor.

10. The method of claim 9, further comprising:

statically or dynamically managing, by the network interface card, in a memory a mapping table of the virtual machine queue and the logical processor in accordance with a predetermined control signal.

11. The method of claim 9, wherein in step (B), the network interface card identifies the tenant based on L2 information or IP information of the received packet.

12. The method of claim 9, further comprising:

reflecting, by the network interface card, a traffic processing amount in one or more logical processors in operation, which belong to the same tenant in accordance with a dynamic mapping method in real time to increase or decrease the number of the used logical processors.

13. The method of claim 12, wherein in regard to creation of the logical processor in which the traffic processing amount is equal to or more than an upper threshold, the network interface card operates an additional logical processor by performing a spreading process and maps any one or more virtual machine queues that belong to the corresponding same tenant to the additional logical processor.

14. The method of claim 12, wherein in regard to creation of the logical processor in which the traffic processing amount is equal to or less than a lower threshold, the network interface card controls the corresponding logical processor to be in an idle state by performing a coalescing process and maps the virtual machine queue mapped to the logical processor changed to the idle state to another logical processor in operation.

15. The method of claim 9, wherein the hypervisor creates a plurality of virtual machines that operate as a virtualized CPU which operates by different operating systems with respect to the tenant information as the one or more virtual machines.

16. The method of claim 9, wherein in step (D), the logical processor processes the packet received from one or more virtual machine queues and transfers the packet to the virtual machine corresponding to the corresponding virtual machine queue through the virtual switch.

* * * * *